3 Sheets--Sheet 1.

SAMUEL FINK.

Improvement in Bee Hives.

No. 123,470.  Patented Feb. 6, 1872.

Witnesses.
E. H. Bates
D. D. Kane

Inventor.
Samuel Fink,
Chipman Hosmer & Co
Attys.

3 Sheets--Sheet 2.

SAMUEL FINK.

Improvement in Bee Hives.

No. 123,470.

Patented Feb. 6, 1872.

Witnesses.
E. H. Bates
D. D. Kane

Inventor.
Samuel Fink,
Chipman Hosmer & Co
Attys

3 Sheets--Sheet 3.

SAMUEL FINK.

Improvement in Bee Hives.

No. 123,470.                            Patented Feb. 6, 1872

Witnesses.
E. H. Bates
D. D. Kane

Inventor.
Samuel Fink,
Chipman Hosmer & Co.
Attys.

123,470

UNITED STATES PATENT OFFICE.

SAMUEL FINK, OF LINDSEY, OHIO.

IMPROVEMENT IN BEE-HIVES.

Specification forming part of Letters Patent No. 123,470, dated February 6, 1872.

*To all whom it may concern:*

Be it known that I, SAMUEL FINK, of Lindsey, in the county of Sandusky and State of Ohio, have invented a new and valuable Improvement in Bee-Hives; and I do hereby declare that the following is a full, clear, and exact description of the construction and operation of the same, reference being had to the annexed drawing making a part of this specification and to the letters and figures of reference marked thereon.

Figure 1:
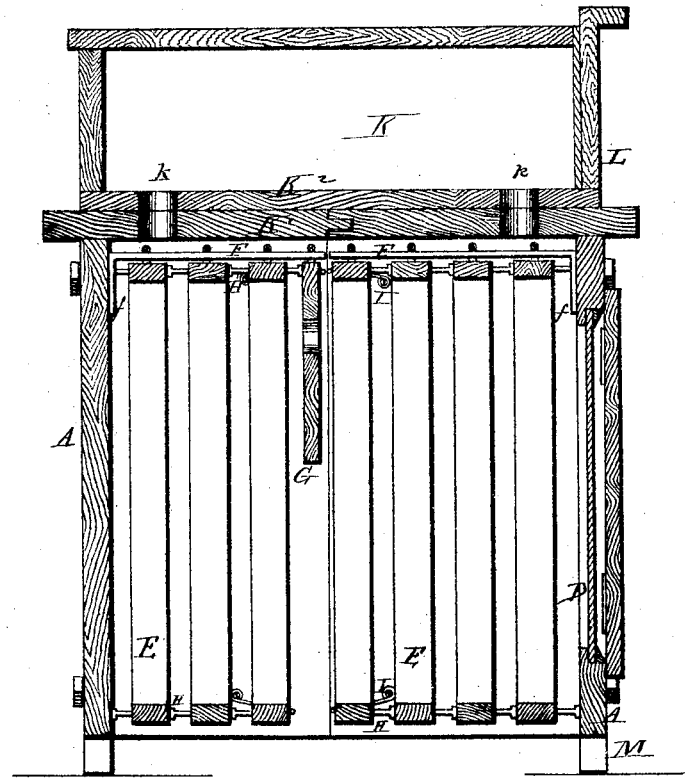
Figure 2:
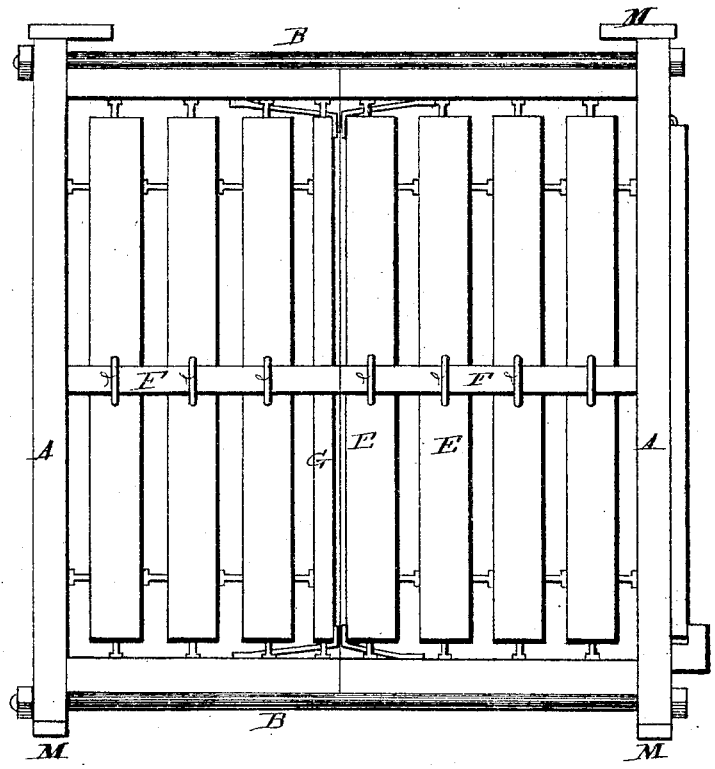
Figure 3:
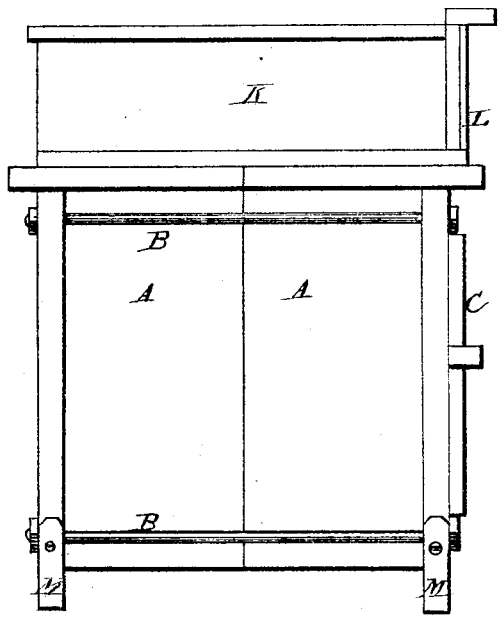
Figure 5:
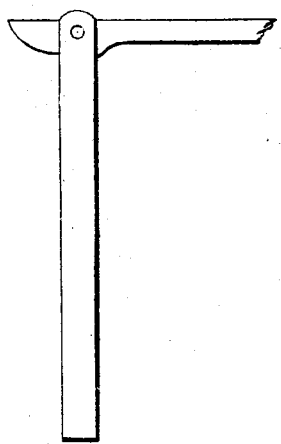
Figure 4:
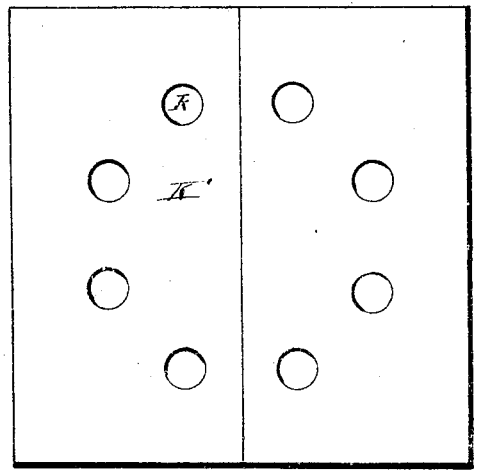

Figure 1 of the drawing is a representation of a vertical section of my invention. Fig. 2 is a top view with the top board removed. Fig. 3 is a side elevation. Fig. 4 is a top view with the honey-box removed. Fig 5 is a representation of the implement used in dividing the hive.

This invention has relation to bee-hives; and the novelty consists in providing a hive with pivoted legs, which may be used to raise the hive in summer and to let it down in winter. It also consists in the improved general construction and arrangement of a hive, which may be divided into two equal halves to prevent swarming, as hereinafter described.

Referring to the accompanying drawing, A A represents the two equal halves of my improved double hive, secured together by means of the iron rods B, having heads on one end, and fastened by nuts on the other end. C designates the door of the hive hinged to the front thereof. Inside it is a glass window, D. E represents the comb-frames, hung by means of staples $e$ on two L-shaped bars, F F, running along the top of the hive in a continuous line, their ends being close together when the hive is complete. G indicates a perforated dividing-board, hung on one of the rods F midway between the two sections of comb-frames. When the hive is divided an equal number of comb-frames, forming a section, is appropriated for each division of the hive. H designates pins, driven into the edges or sides of the comb-frames to keep them separate. The end of each of the bars F, nearest the wall of the hive, is secured thereto, as shown at $f$ in Fig. 1. I represents hooks, hinged to the sides of the hive and used for the purpose of retaining the comb-frames in position after the hive has been divided. K designates the honey-box, which is designed to rest on the top of the hive, $K^1$ being the top of the hive and $K^2$ the bottom of the honey-box, bored with a corresponding circular row of holes, $h$, to let the bees into the honey-box. L designates a sliding door to the front of the honey-box. Across the top of the hive and the bottom of the honey-box are drawn coinciding lines running at right angles to each other, and extending out to the side of the hive and boxes. These lines serve as guides in boring the holes, and afterward arranging the honey-box in a proper position. M represent legs, pivoted to the sides of the hive and capable of being raised or lowered, so as to elevate the hive in summer and let down in winter—the bottom being open.

When the bees are about to swarm, the nuts on the rods B are taken off and the hive divided into two equal and separate halves by the use of an implement shown in Fig. 5. To each full half is then added an empty half, provided for the purpose, thus making two complete hives, and preventing the swarming bees from leaving.

When the two divisions of the hive are brought together they are fitted to each other by means of pins and sockets in their edges.

What I claim as my invention, and desire to secure by Letters Patent, is—

In a divisible hive, the hooks I, adapted to retain the comb-frames in position when the hive is divided, as and for the purpose described.

In testimony that I claim the above I have hereunto subscribed my name in the presence of two witnesses.

SAMUEL FINK.

Witnesses:
  J. B. LUCKEY,
  L. B. MYERS.